United States Patent
Oh et al.

(10) Patent No.: US 11,296,312 B2
(45) Date of Patent: Apr. 5, 2022

(54) NEGATIVE ELECTRODE ACTIVE MATERIAL FOR LITHIUM SECONDARY BATTERY AND METHOD FOR PREPARING THE SAME

(71) Applicant: LG CHEM, LTD., Seoul (KR)

(72) Inventors: Il-Geun Oh, Daejeon (KR);
Jung-Hyun Choi, Daejeon (KR);
Je-Young Kim, Daejeon (KR);
Yong-Ju Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 181 days.

(21) Appl. No.: 16/621,119

(22) PCT Filed: Dec. 7, 2018

(86) PCT No.: PCT/KR2018/015566
§ 371 (c)(1),
(2) Date: Dec. 10, 2019

(87) PCT Pub. No.: WO2019/112390
PCT Pub. Date: Jun. 13, 2019

(65) Prior Publication Data
US 2020/0112019 A1    Apr. 9, 2020

(30) Foreign Application Priority Data

Dec. 8, 2017 (KR) .......................... 10-2017-0168436

(51) Int. Cl.
| | | |
|---|---|---|
| *H01M 4/485* | (2010.01) | |
| *H01M 4/58* | (2010.01) | |
| *H01M 4/131* | (2010.01) | |
| *H01M 4/1397* | (2010.01) | |
| *H01M 4/136* | (2010.01) | |
| *H01M 4/133* | (2010.01) | |
| *H01M 4/66* | (2006.01) | |
| *H01M 10/0525* | (2010.01) | |
| *H01M 4/02* | (2006.01) | |

(52) U.S. Cl.
CPC ........... *H01M 4/131* (2013.01); *H01M 4/133* (2013.01); *H01M 4/5825* (2013.01); *H01M 4/661* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | |
|---|---|---|
| 2011/0097629 A1 | 4/2011 | Yew et al. |
| 2014/0363741 A1 | 12/2014 | Lee et al. |
| 2016/0087267 A1 | 3/2016 | Yoshio et al. |
| 2016/0118652 A1 | 4/2016 | Wu et al. |
| 2016/0336592 A1 | 11/2016 | Hirose et al. |
| 2016/0344019 A1 | 11/2016 | Hirose et al. |
| 2017/0117543 A1 | 4/2017 | Park et al. |
| 2018/0241033 A1 | 8/2018 | Do et al. |

FOREIGN PATENT DOCUMENTS

| | | |
|---|---|---|
| CN | 1103259019 A | 8/2013 |
| EP | 3 118 916 A1 | 1/2017 |
| JP | 2012-156055 A | 8/2012 |
| JP | 2014-71948 A | 4/2014 |
| JP | 2015-149221 A | 8/2015 |
| JP | 2015-165482 A | 9/2015 |
| KR | 10-2011-0046076 A | 5/2011 |
| KR | 10-1555932 B1 | 9/2015 |
| KR | 10-2016-0034799 A | 3/2016 |
| KR | 10-2017-0048211 A | 5/2017 |
| KR | 10-2017-0057437 A | 5/2017 |

OTHER PUBLICATIONS

European Search Report for European Patent Application No. 18885947.4, dated Oct. 27, 2020.
Yang et al., "Effects of lithium fluoride coating on the performance of nano-silicon as anode material for lithium-ion batteries". Materials Letters, vol. 184, Aug. 3, 2016, pp. 65-68, XP029760714.
International Search Report for PCT/KR2018/015566 dated Apr. 30, 2019.

*Primary Examiner* — Yoshitoshi Takeuchi
(74) *Attorney, Agent, or Firm* — Birch, Stewart, Kolasch & Birch, LLP

(57) ABSTRACT

A negative electrode active material including a core, an intermediate layer on a surface of the core, and a shell layer on a surface of the intermediate layer, wherein the core includes a silicon oxide of $SiO_x$ (0<x<2); the intermediate layer includes a lithium silicate, the shell layer includes lithium fluoride (LiF) and the intermediate layer is present in an amount of 5 wt %-15 wt % based on a total weight of the negative electrode active material. Also, a method for preparing the negative electrode active material, and a negative electrode and lithium secondary battery including the same. The negative electrode active material provides excellent initial efficiency and life characteristics.

10 Claims, No Drawings

NEGATIVE ELECTRODE ACTIVE MATERIAL FOR LITHIUM SECONDARY BATTERY AND METHOD FOR PREPARING THE SAME

TECHNICAL FIELD

The present application claims priority to Korean Patent Application No. 10-2017-0168436 filed on Dec. 8, 2017 in the Republic of Korea, the disclosures of which are incorporated herein by reference.

The present disclosure relates to a negative electrode active material for a lithium secondary battery and a method for preparing the same. More particularly, the present disclosure relates to a negative electrode active material for a lithium secondary battery which imparts excellent life characteristics, and a method for preparing the same.

BACKGROUND ART

As technological development and demand for mobile instruments have been increased, rechargeable secondary batteries have been increasingly in demand as energy sources. Among such secondary batteries, lithium secondary batteries having high energy density and voltage, long cycle life and a low discharge rate have been commercialized and used widely.

A lithium secondary battery has a structure in which a lithium salt-containing electrolyte is injected to an electrode assembly including a positive electrode and a negative electrode formed by applying each electrode active material onto an electrode current collector, and a porous separator interposed between both electrodes. Herein, each electrode is obtained by applying slurry including an active material, a binder and a conductive material to a current collector, followed by drying and pressing.

The fundamental characteristics, such as capacity, output and life, of a lithium secondary battery is significantly affected by the material for a negative electrode. To maximize the performance of a battery, it is required for the negative electrode active material to have an electrochemical reaction potential near the potential of lithium metal and high reversibility to the reaction with lithium ions and to show a high lithium ion diffusion rate in the active material. As a material satisfying such requirements, a carbonaceous material has been used frequently.

Although such carbonaceous active materials have high stability and reversibility, they are limited in terms of capacity. Therefore, Si-based materials with a high theoretical capacity have been applied recently in the field requiring a high-capacity battery, such as electric vehicles, hybrid electric vehicles, or the like. However, Si has problems in that it causes degradation of life characteristics during repeated charge/discharge and shows rapid volumetric expansion. Thus, some studies have been conducted to improve life characteristics and to alleviate volumetric expansion by using silicon oxides ($SiO_x$). However, silicon oxides have a high discharge capacity but form an irreversible phase after lithium intercalation to cause depletion of lithium, resulting in low initial efficiency.

Meanwhile, some attempts have been made to improve life characteristics by using fluoroethylene carbonate (FEC) as an additive for an electrolyte, when applying electrodes including silicon oxides. However, this is not preferred in terms of cost and causes a problem of gas generation during storage at high temperature.

As a result, there still has been a need for improving Si-based negative electrode active materials.

DISCLOSURE

Technical Problem

The present disclosure is designed to solve the problems of the related art, and therefore the present disclosure is directed to providing a negative electrode active material for a lithium secondary battery which has improved initial efficiency and life characteristics, and a method for preparing the same.

The present disclosure is also directed to providing a negative electrode including the negative electrode active material and a secondary battery provided with the negative electrode.

Technical Solution

In one aspect of the present disclosure, there is provided a negative electrode active material including a core, an intermediate layer on a surface of the core and a shell layer on a surface of the intermediate layer, wherein the core includes a silicon oxide of formula $SiO_x$ (0<x<2); the intermediate layer includes a lithium silicate; the shell layer includes lithium fluoride (LiF), and the intermediate layer is present in an amount of 5-15 wt % based on a total weight of the negative electrode active material. According to an embodiment of the present disclosure, the negative electrode active material has a particle-like shape.

The silicon oxide of $SiO_x$ (0<x<2) refers to a nanocomposite structure in which Si is present in combination with $SiO_2$ and may be represented by of $SiO_x$ (0<x<2) or SiO herein for the purpose of simple description, and x in $SiO_x$ (0<x<2) may be determined by the mixing ratio of Si with $SiO_2$. Therefore, an embodiment of negative electrode active material substantially consisting of $SiO_x$ (0<x<2) alone, not a combination of Si with $SiO_2$, such as an embodiment of negative electrode active material having a core substantially consisting of SiO alone, is not included in the scope of the present disclosure.

The lithium silicate-containing layer (also referred to as the intermediate layer) may include lithium silicate represented by the formula of $Li_aSi_bO_c$ (2≤a≤4, 0<b≤2, 2<c≤5) and $SiO_y$ (0<y<2), and the lithium silicate may include $Li_2Si_2O_5$, $Li_2SiO_3$ and $Li_4SiO_4$. The oxygen in $SiO_y$ (0<y<2) present in the lithium silicate-containing layer is derived from $SiO_2$ present in the core. Therefore, y in $SiO_y$ (0<y<2) satisfies the relationship of 0<y<x and is smaller than x in $SiO_x$ (0<x<2) determined from Si and $SiO_2$ present in combination in the core.

The lithium silicate-containing layer may have a thickness of 1-1,000 nm, 10-800 nm, or 100-500 nm.

The LiF coating layer (also referred to as the shell layer) may be present in an amount of 0.1-3 wt % based on the total weight of the negative electrode active material.

The LiF coating layer may have a thickness of 10-200 nm, 20-150 nm, or 30-150 nm.

The negative electrode active material according to an embodiment of the present disclosure may further include a carbon coating layer on the LiF coating layer.

In another aspect of the present disclosure, there is provided a method for preparing a negative electrode active material, including the steps of:

(S1) dispersing particles of a silicon oxide of formula $SiO_x$ (0<x<2) in a dispersion medium to prepare a suspension;

(S2) adding a solution including lithium fluoride (LiF) to the suspension to obtain a mixture, and agitating and filtering the mixture to obtain $SiO_x$ particles having a shell layer including LiF on a surface thereof; and (S3) heat treating the $SiO_x$ particles having the shell layer to form an intermediate layer including a lithium silicate at an interface between the $SiO_x$ particles and the shell layer, wherein the heat treatment in step (S3) is carried out at a temperature lower than a melting point of LiF.

In still another aspect of the present disclosure, there are provided a negative electrode including a current collector and an electrode layer formed on at least one surface of the current collector, wherein the electrode layer includes the above-described negative electrode active material, and a lithium secondary battery including the negative electrode.

Advantageous Effects

The negative electrode active material according to an embodiment of the present disclosure is formed of particles including a core consisting of a silicon oxide of $SiO_x$ (0<x<2), and a lithium silicate-containing layer and a LiF coating layer formed on the surface thereof. It is possible to provide excellent initial efficiency by virtue of the lithium silicate-containing layer, while minimizing a structural collapse of the negative electrode active material. Further, it is possible to alleviate volumetric expansion of $SiO_x$ (0<x<2) by virtue of the LiF coating layer, while preventing depletion of an electrolyte during the decomposition of the electrolyte occurring on the negative electrode surface upon charging. Thus, it is possible to assist formation of a stable solid electrolyte interface (SEI) layer to improve life characteristics of batteries.

BEST MODE

Hereinafter, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect of the present disclosure, there is provided a negative electrode active material including a core, an intermediate layer and a shell layer, wherein the core includes a silicon oxide of $SiO_x$ (0<x<2); the intermediate layer is a lithium silicate-containing layer disposed on the surface of the silicon oxide; the shell layer is a LiF coating layer disposed on the surface of the lithium silicate-containing layer, and the lithium silicate-containing layer is present in an amount of 5-15 wt % based on the total weight of the negative electrode active material.

According to an embodiment of the present disclosure, the silicon oxide of $SiO_x$ (0<x<2) may include a nanocomposite structure in which Si is present in combination with $SiO_2$, wherein the composition (x) may be determined by the ratio between silicon and oxygen. For example, when Si is present in combination with $SiO_2$ in silicon oxide of $SiO_x$ (0<x<2) at a molar ratio of 1:1, the silicon oxide may be represented by SiO wherein x=1.

Si contained in the silicon oxide of $SiO_x$ (0<x<2) is an ingredient substantially capable of causing an electrochemical reaction when lithium ions released from a positive electrode active material during charge are intercalated/deintercalated. Si may be crystalline or amorphous. When Si is crystalline, Si crystal size may be 500 nm or less, preferably 300 nm or less, and more preferably 0.05-20 nm. Herein, Si crystal size may be determined by X-ray diffractometry (XRD) or electron microscopy (scanning electron microscopy (SEM), transmission electron microscopy (TEM)) in general.

In addition, $SiO_2$ contained in the silicon oxide of $SiO_x$ (0<x<2) may be crystalline or amorphous. Examples of crystalline $SiO_2$ include quartz, cristobalite or tridymite and may have a crystal size of 1-100 nm, preferably 1-80 nm, and more preferably 1-50 nm. When $SiO_2$ is amorphous, it appears in the amorphous structure when carrying out XRD.

According to an embodiment of the present disclosure, the lithium silicate-containing layer is an intermediate layer formed on at least partially, preferably totally, on the surface of the core including a silicon oxide of $SiO_x$ (0<x<2), and means a layer in which lithium silicate is present in combination with a silicon oxide as a product resulting from the reaction of the silicon oxide of $SiO_x$ (0<x<2) with lithium.

The lithium silicate is represented by $Li_aSi_bO_c$ ($2 \leq a \leq 4$, $0 < b \leq 2$, $2 < c \leq 5$) and particular examples thereof include $Li_2Si_2O_5$, $Li_2SiO_3$ and $Li_4SiO_4$. Such lithium silicate is formed to such a level that it can reduce the initial irreversibility, and thus can improve initial efficiency while minimizing a structural collapse of the negative electrode active material.

The lithium silicate may be present in an amount of 5-15 wt %, preferably 5-12 wt %, and more preferably 6-10 wt % based on the total weight of the negative electrode active material particles. When the content of the lithium silicate is less than 5 wt %, it is not possible to improve the initial efficiency sufficiently. When the content of the lithium silicate is more than 15 wt %, an inactive phase reacts excessively to cause a structural collapse, an increase in diffusion resistance and a decrease in discharge capacity per unit weight, and the negative electrode active material may be in an unstable state.

The silicon oxide present in the lithium silicate-containing layer means a silicon oxide remaining after the formation of lithium silicate through the reaction of the silicon oxide of $SiO_x$ (0<x<2) with lithium. As oxygen is consumed during the formation of lithium silicate, the silicon oxide is present in the form of silicon oxide of $SiO_y$ (0<y<2).

In addition, the lithium silicate-containing layer may have a thickness of 1-1,000 nm, 10-800 nm, or 50-500 nm. When satisfying the above-defined thickness range, it is possible to ensure a lithium ion diffusion rate desirably.

According to an embodiment of the present disclosure, the LiF coating layer may be formed as a uniform LiF coating layer by mixing and heat treating the silicon oxide of $SiO_x$ (0<x<2), a lithium salt solution and a fluoride salt solution and carrying out drying (e.g. at 150° C.) under vacuum or under inert atmosphere so that Li ions may concentrate around the OH functional groups on the $SiO_x$ surface. In addition, the $SiO_x$ surface reacts with LiF through the heat treatment to form lithium silicate and a LiF coating layer having strong binding force can be formed through the chemical binding of $SiO_x$-lithium silicate-LiF. Such a LiF coating layer may function as an artificial SEI layer and provide an effect similar to the effect of fluoroethylene carbonate (FEC) used conventionally as an additive for electrolyte for the purpose of improving the life characteristics of a battery. In other words, the LiF coating layer prevents depletion of an electrolyte during the decomposition of the electrolyte occurring on the surface of a negative electrode upon charging to assist formation of a stable solid electrolyte interface (SEI) layer, thereby improving life characteristics of batteries. In addition, the LiF coating layer may help alleviation of volumetric expansion of $SiO_x$.

The LiF coating layer may be formed on the surface of $SiO_x$ in an amount of 0.1-3 wt %, preferably 0.3-1 wt %, and more preferably 0.4-1 wt % based on the total weight of the negative electrode active material. When the content of the LiF coating layer satisfies the above-defined range, it is possible to provide an effect of improving life characteristics of batteries significantly and to minimize a decrease in discharge capacity per unit weight. In addition, considering this, the LiF coating layer advisably has a thickness of 10-200 nm, 20-150 nm, or 30-100 nm.

The negative electrode active material particles according to an embodiment of the present disclosure may have an average particle diameter (D50) of 1-10 µm, preferably 3-7 µm, wherein the average particle diameter (D50) of the negative electrode active material particles means the diameter of accumulated 50 vol % in the particle size distribution determined by the laser scattering method or Coulter counter method.

In addition, the negative electrode active material particles according to an embodiment of the present disclosure may further include a carbon coating layer on the LiF coating layer to impart conductivity as necessary.

The carbon coating layer may include a crystalline or amorphous carbon coating layer.

The crystalline carbon coating layer may be formed by mixing inorganic particles or inorganic oxide particles with crystalline carbon in a solid or liquid phase and carrying out heat treatment. The amorphous carbon coating layer may be formed by coating the surface of inorganic particles or inorganic oxide particles with an amorphous carbon precursor and carrying out heat treatment and carbonization.

Typical examples of the crystalline carbon may include graphene and graphite. Typical examples of the amorphous carbon precursor may include resins, such as a pheonolic resin, naphtahalene resin, polyvinyl alcohol resin, urethane resin, polyimide resin, furan resin, cellulose resin, epoxy resin and polystyrene resin, coal-based pitch, tar, low-molecular weight heavy oil, or the like.

The carbon coating layer may be present in an amount of 20 wt % or less, particularly 1-10 wt %, based on the total weight of the negative electrode active material particles. When the content of the carbon coating layer is larger than 20 wt %, the carbon coating layer has an excessively large thickness to interrupt lithium intercalation/deintercalation, thereby causing a decrease in discharge capacity. Also, in this case, initial efficiency is decreased undesirably due to the irreversible reaction between amorphous carbon and Li.

The negative electrode active material according to an embodiment of the present disclosure may be obtained by the method including the following steps:

(S1) dispersing particles of a silicon oxide of $SiO_x$ (0<x<2) in a dispersion medium to prepare a suspension;

(S2) adding a lithium fluoride solution to the suspension to obtain a mixture, and agitating and filtering the mixture to obtain $SiO_x$ particles having a LiF coating layer formed thereon; and (S3) heat treating the $SiO_x$ particles having a LiF coating layer under vacuum or under inert atmosphere to form a lithium silicate-containing layer at the interface between the $SiO_x$ particles and the LiF coating layer.

In step ($S_1$), particles of a silicon oxide of $SiO_x$ (0<x<2) are dispersed in a dispersion medium, such as ethanol, to prepare a suspension. For example, particles of a silicon oxide of $SiO_x$ (0<x<2) may be dispersed in a dispersion medium, such as ethanol, at 10 wt % to prepare a suspension. Even when LiF is used in an amount of about 10 times of the weight of particles of a silicon oxide of $SiO_x$ (0<x<2), most of LiF is removed through filtering. Thus, a layer containing a small amount of LiF is formed on the surface of particles of a silicon oxide of $SiO_x$ (0<x<2). According to an embodiment of the present disclosure, when Si and $SiO_2$ are present in combination at a molar ratio of 1:1, it is possible to prepare a suspension in which particles of silicon oxide of SiO (x=1) are dispersed.

In step (S2), a lithium fluoride solution is added to the suspension of silicon oxide particles to obtain a mixture. Then, after the mixture is agitated and filtered, a LiF coating layer may be formed while the surface of $SiO_x$ particles is in contact with LiF formed from the reaction of the lithium salt with the fluoride salt. Herein, in the mixture, the suspension of silicon oxide particles and lithium fluoride solution may be used at a weight ratio of 1:1-1:10, 1:1-1:2, or 1:1. When satisfying the above-defined ratio, it is possible to provide a sufficient amount of LiF and to perform more perfect coating of the silicon oxide surface with LiF.

The agitation may be carried out at 25-100° C., preferably 25-60° C., for 0.5-1 hours, preferably 0.6-1 hours, to form the LiF coating layer.

The lithium fluoride solution may be obtained by mixing a lithium salt solution with a fluoride salt solution.

The lithium salt solution may include a lithium salt, such as lithium acetate ($LiCH_3COO$), lithium trifluoroacetate ($LiCF_3COO$) or lithium octanoate, dissolved in water or ethanol at 1-5 wt %, 1-3 wt %, or 1 wt %.

The fluoride salt solution may include a fluoride salt, such as ammonium fluoride, tetramethylammonium fluoride or tetrabutylammonium fluoride dissolved in water at 1-5 wt %, 1-3 wt %, or 1 wt %.

In the negative electrode active material particles obtained as described above, the content of the LiF coating layer may be 0.1-3 wt %, 0.1-2 wt %, or 0.1-1 wt %. When the LiF coating layer is formed in an amount within the above-defined range, it is possible to provide an effect of significantly improving life characteristics of batteries and to minimize a decrease in discharge capacity per unit weight.

In step (S3), the silicon oxide particles having the LiF coating layer formed from step (S2) are heat treated under vacuum or under inert atmosphere, such as nitrogen or argon. It is possible to induce alloying of a silicon oxide ($SiO_x$) through the heat treatment to form lithium silicate at the interface between the silicon oxide ($SiO_x$) particles and the LiF coating layer. Herein, a part of Li forming the LiF coating layer participates in alloying of lithium.

The heat treatment may be carried out at a temperature lower than the melting point of LiF, for example, less than 800° C., preferably at a temperature of 700-780° C., for 1-3 hours to ensure reactivity through the contact between silicon oxide ($SiO_x$) particles and LiF, while controlling the reactivity to a desired level. When the heat treatment is carried out at a temperature equal to or higher than the melting point of LiF, reactivity is increased excessively, thereby making it difficult to retain the LiF coating layer. In this case, Si crystals contained in $SiO_x$ particles may be grown to cause degradation of the life of a battery. For example, while crystalline Si is converted into amorphous Si during charge/discharge, a structural collapse may occur to cause degradation of battery life. For this, the heat treatment is carried out at a relatively low temperature according to the present disclosure, and thus it is possible to retain the LiF coating layer to a desired level and to minimize growth of Si crystals. Meanwhile, when the heat treatment is carried out at an excessively low temperature, for example at a temperature lower than 750° C., no reaction occurs between LiF and $SiO_x$ and no lithium silicate is formed. Then, the LiF coating layer having poor binding force remains as an unreacted material undesirably.

In other words, according to the method of the present disclosure, heat treatment of step (S3) is carried out at a relatively low temperature to form lithium silicate to such a level that initial irreversibility may be reduced while minimizing growth of Si crystals, i.e., to form lithium silicate in an amount of 5-15 wt % based on the total weight of the negative electrode active material. In this manner, it is possible to improve initial efficiency while minimizing a structural collapse of the negative electrode active material.

In addition, when the LiF coating layer formed from step (S2) is retained on the surface of silicon oxide ($SiO_x$) in an amount of 0.1-1 wt % based on the weight of silicon oxide, the LiF coating layer may functions as an artificial SEI to provide an effect similar to the effect of fluoroethylene carbonate (FEC) used conventionally as an additive for electrolyte to improve the life characteristics of a battery. Therefore, the LiF coating layer not only alleviates volumetric expansion of $SiO_x$ but also helps formation of a stable solid electrolyte interface (SEI) by preventing depletion of an electrolyte during the decomposition of the electrolyte occurring on the negative electrode surface upon charging, thereby improving life characteristics.

Meanwhile, the method according to the present disclosure may further include a step of forming a carbon coating layer on the LiF coating layer after step (S3).

The carbon coating layer may be formed by using soft carbon, hard carbon, graphene, amorphous carbon or crystalline carbon through a chemical vapor deposition (CVD) process or pitch coating process.

The carbon coating layer may be present in an amount of 5 wt % or less, particularly 1-3 wt %, based on the total weight of the negative electrode active material. When the content of the carbon coating layer is larger than 5 wt %, the carbon coating layer has an excessively large thickness, and thus interrupts lithium intercalation/deintercalation. As a result, discharge capacity is decreased and initial efficiency is reduced due to irreversible reaction between amorphous carbon and Li.

In another aspect of the present disclosure, there is provided a negative electrode including the negative electrode active material obtained as described above.

Particularly, the negative electrode according to an embodiment of the present disclosure includes a current collector and an electrode layer including the negative electrode active material according to the present disclosure and formed on at least one surface of the current collector.

The electrode layer may be obtained by applying negative electrode slurry, prepared by dispersing the negative electrode active material according to the present disclosure, a binder and a conductive material in a solvent, to at least one surface of a current collector, followed by drying and pressing.

The current collector is not particularly limited, as long as it has conductivity while not causing any chemical change in the corresponding battery. Particular examples of the current collector include copper, stainless steel, aluminum, nickel, titanium, baked carbon, copper or stainless steel surface-treated with carbon, nickel, titanium, silver, or the like, aluminum-cadmium alloy, or the like. Although there is no particular limitation in the thickness of the current collector, the current collector may have a thickness of 3-500 µm in general.

The negative electrode active material includes a silicon oxide of $SiO_x$ (0<x<2) and lithium silicate, and further includes a LiF coating layer formed on the surface of lithium silicate, and thus improves initial efficiency while minimizing a structural collapse of the negative electrode active material, prevents depletion of an electrolyte during the decomposition of the electrolyte occurring on the negative electrode surface upon charging to help formation of a stable solid electrolyte interface (SEI), thereby improving life characteristics.

The negative electrode active material may be used in an amount of 80-99 wt % based on the total weight of the negative electrode slurry composition.

The binder is an ingredient which assists the binding between an active material with a conductive material and the binding to a current collector. In general, the binder is added in an amount of 0.1-20 wt % based on the total weight of the negative electrode slurry composition. Particular examples of the binder include polyvinylidene-co-hexafluoropropylene (PVDF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polyacrylate, styrene butadiene rubber (SBR), or the like.

The conductive material is not particularly limited, as long as it has conductivity while not causing any chemical change in the corresponding battery. Particular examples of the conductive material include: carbon black, such as carbon black, acetylene black, Ketjen black, channel black, furnace black, lamp black or thermal black; conductive fibers, such as carbon fibers or metallic fibers; metal powder, such as carbon fluoride, aluminum or nickel powder; conductive whisker, such as zinc oxide or potassium titanate; conductive metal oxide, such as titanium oxide; and conductive materials, such as polyphenylene derivatives. The conductive material may be added in an amount of 0.1-20 wt % based on the total weight of the negative electrode slurry composition.

The solvent may include water or an organic solvent, such as N-methyl-2-pyrrolidone (NMP), and may be used in such an amount that the negative electrode slurry including the negative electrode active material optionally with a binder and conductive material may have a desired level of viscosity. For example, the negative electrode slurry may have a solid content of 50-95 wt %, preferably 70-90 wt %.

In addition, there is no particular limitation in the coating process of the negative electrode slurry, as long as it is a method used currently in the art. For example, a coating process using a slot die may be used, or a Mayer bar coating process, gravure coating process, dip coating process, spray coating process, etc. may be used.

In still another aspect of the present disclosure, there is provided a lithium secondary battery including the negative electrode. Particularly, the lithium secondary battery may be obtained by injecting a lithium salt-containing electrolyte to an electrode assembly including a positive electrode, the above-described negative electrode and a separator interposed between the positive electrode and the negative electrode.

The positive electrode may be obtained by mixing a positive electrode active material, a conductive material, a binder and a solvent to prepare slurry, and directly coating the slurry onto a metal current collector, or casting the slurry onto a separate support and laminating a positive electrode active material film peeled from the support on a metal current collector.

The active material used for the positive electrode may be any one type of active material particles selected from the group consisting of $LiCoO_2$, $LiNiO_2$, $LiMn_2O_4$, $LiCoPO_4$, $LiFePO_4$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, and each of x, y and z independently represents the atomic proportion of an element forming oxide, wherein $0 \leq x < 0.5$, $0 \leq y < 0.5$, $0 \leq z < 0.5$ and $0 < x+y+z \leq 1$), and combinations thereof.

Meanwhile, the same conductive material, binder and solvent as those used for manufacturing the negative electrode may be used.

The separator may be a conventional porous polymer film used currently as a separator, and particular examples thereof include a porous polymer film made of a polyolefinic polymer, such as ethylene homopolymer, propylene homopolymer, ethylene/butene copolymer, ethylene/hexene copolymer or ethylene/methacrylate copolymer. Such porous polymer films may be used alone or in the form of a laminate. In addition, an insulating thin film having high ion permeability and mechanical strength may be used. The separator may include a safety reinforced separator (SRS) including a ceramic material coated on the surface of the separator to a small thickness. In addition, a conventional porous non-woven web, such as non-woven web made of high-melting point glass fibers or polyethylene terephthalate fibers, may be used, but the scope of the present disclosure is not limited thereto.

The electrolyte includes a lithium salt as an electrolyte and an organic solvent for dissolving the electrolyte.

There is no particular limitation in the lithium salt, as long as it is used currently for an electrolyte for a secondary battery. For example, the anion of lithium salt may be any one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

Any conventional organic solvent may be used as the organic solvent contained in the electrolyte with no particular limitation. Typical examples of the organic solvent include at least one selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxy ethane, diethoxy ethane, vinylene carbonate, sulforane, γ-butyrolactone, propylene sulfite and tetrahydrofuran.

Particularly, ethylene carbonate and propylene carbonate, which are cyclic carbonates among the carbonate organic solvents, have a high dielectric constant and dissociate the lithium salt in an electrolyte well. In addition, it is possible to prepare an electrolyte having high electrical conductivity more preferably, when using such cyclic carbonates in combination with low-viscosity low-dielectric constant linear carbonates, such as dimethyl carbonate and diethyl carbonate, at an adequate ratio.

Optionally, the electrolyte used according to the present disclosure may further include an additive, such as an overcharge-preventing agent, contained in the conventional electrolyte.

The lithium secondary battery according to an embodiment of the present disclosure may be obtained by interposing the separator between the positive electrode and the negative electrode to form an electrode assembly, introducing the electrode assembly to a pouch, cylindrical battery casing or a prismatic battery casing, and then injecting the electrolyte thereto to finish a secondary battery. Otherwise, the lithium secondary battery may be obtained by stacking the electrode assemblies, impregnating the stack with the electrolyte, and introducing the resultant product to a battery casing, followed by sealing.

According to an embodiment of the present disclosure, the lithium secondary battery may be a stacked, wound, stacked and folded or a cable type battery.

The lithium secondary battery according to the present disclosure may be used for a battery cell used as a power source for a compact device, and may be used preferably as a unit battery for a medium- or large-size battery module including a plurality of battery cells. Particular examples of such medium- or large-size devices include electric vehicles, hybrid electric vehicles, plug-in hybrid electric vehicles, power storage systems, or the like. Particularly, the lithium secondary battery may be useful for batteries for hybrid electric vehicles and new & renewable energy storage batteries, requiring high output.

MODE FOR DISCLOSURE

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

Step 1

First, SiO (Aldrich) was added to a solution containing 1 wt % of lithium acetate ($LiCH_3COO$) and ammonium fluoride ($NH_4HF$) in ethanol to a concentration of 1 wt %. The resultant mixture was agitated at 50° C. for 1 hour and filtered to obtain SiO particles having a LiF coating layer. The content of the LiF coating layer in the resultant particles is 1 wt %.

Step 2

The SiO particles coated with a LiF coating layer obtained from Step 1 were heat treated under Ar atmosphere at 750° C. for 1 hour to form a lithium silicate-containing layer including lithium silicate ($Li_2Si_2O_5$, $Li_2SiO_3$ and $Li_4SiO_4$) in combination with $SiO_y$ (y<1) at the interface between SiO particles and the LiF coating layer. In this manner, negative electrode material particles (average particle diameter (D50): 5-6 μm) was obtained.

Example 2

Negative electrode active materials were obtained in the same manner as described in Example 1, except that the negative electrode active material obtained from Step 2 of Example 1 was mixed with 2 wt % of pitch based on the total weight of the negative electrode active material and heat treatment was carried out at 1,000° C. for 1 minute to form a carbon coating layer on the LiF coating layer.

Comparative Example 1

SiO particles surface-coated with carbon (carbon coating ratio: 2 wt % based on the weight of SiO particles) and LiF were mixed at a weight ratio of 100:1 in a powdery state and the resultant mixture was heat treated under Ar atmosphere at 800° C. for 10 hours. After analyzing the negative electrode active material with XRD patterns, it was shown that the negative electrode active material obtained from Comparative Example 1 included a lithium silicate-containing layer on the surface of SiO particles and a carbon layer formed on the lithium silicate-containing layer and had no LiF coating layer.

Comparative Example 2

A negative electrode active material was obtained in the same manner as described in Example 1, except that SiO particles surface-coated with carbon were used instead of SiO used in Example 1. After analyzing the negative electrode active material with XRD patterns, it was shown that the negative electrode active material particles obtained from Comparative Example 2 had a structure including a core of surface-coated SiO—lithium silicate-containing layer—carbon layer—LiF layer.

Test Example: Evaluation of Performance of Lithium Secondary Battery

A lithium secondary battery was obtained by using each of the negative electrode active materials according to Examples 1 and 2 and Comparative Examples 1 and 2 to evaluate the performance of each lithium secondary battery.

Manufacture of Negative Electrode

Any one of the negative electrode active materials according to Examples 1 and 2 and Comparative Examples 1 and 2, graphite, carbon black as a conductive material, and carboxymethyl cellulose (CMC) and styrene butadiene rubber (SBR) as binders were mixed at a weight ratio of 4.8:91:1:1.7:1.5 to obtain 5 g of a mixture. Next, 28.9 g of distilled water was added to the mixture to obtain negative electrode slurry. The negative electrode slurry was applied onto copper (Cu) metal foil (thickness: 20 μm) as a negative electrode current collector, followed by drying. Herein, the temperature of circulating air was 60° C. Then, roll pressing was carried out and drying was performed in a vacuum oven at 130° C. for 12 hours. After that, cutting was carried out into a circular shape having an area of 1.4875 $cm^2$ to obtain a negative electrode.

Manufacture of Lithium Secondary Battery

Lithium (Li) metal foil cut into a circular shape having an area of 1.7671 $cm^2$ was used as a positive electrode, and a separator made of porous polyethylene was interposed between the positive electrode and the above-described negative electrode. Then, an electrolyte, including 1M $LiPF_6$ dissolved in a mixed solution of methyl ethyl carbonate (EMC) and ethylene carbonate (EC) at a volume ratio of 7:3 and containing vinylene carbonate dissolved in an amount of 0.5 wt % therein, was injected thereto to obtain a lithium coin half-cell.

Evaluation Example 1: Thickness of Coating Layer

The thickness of the lithium silicate-containing layer and that of the LiF coating layer in each of the negative electrode active materials according to Examples 1 and 2 and Comparative Examples 1 and 2 were determined by X-ray photoelectron spectroscopy depth profiles. After the determination, it was shown that each of the lithium silicate-containing layer and LiF coating layer in each of the negative electrode active materials according to Examples 1 and 2 and Comparative Examples 1 and 2 had the thickness as shown in the following Table 1.

TABLE 1

|  | Lithium silicate-containing layer thickness (nm) | LiF coating layer thickness (nm) |
| --- | --- | --- |
| Ex. 1 | 450 | 80 |
| Ex. 2 | 480 | 70 |
| Comp. Ex. 1 | 570 | 0 |
| Comp. Ex. 2 | 100 | 150 |

Evaluation Example 2: Content of Coating Layer

The content of the lithium silicate-containing layer and that of the LiF coating layer in each of the negative electrode active materials according to Examples 1 and 2 and Comparative Examples 1 and 2 were determined by inductively coupled plasma (ICP)-XPS. After the determination, it was shown that each of the lithium silicate-containing layer and LiF coating layer in each of the negative electrode active materials according to Examples 1 and 2 and Comparative Examples 1 and 2 had the content as shown in the following Table 2, based on the weight of the negative electrode active material.

TABLE 2

|  | Content of lithium silicate-containing layer based on the weight of the negative electrode active material (wt %) | Content of LiF coating layer based on the weight of the negative electrode active material (wt %) |
| --- | --- | --- |
| Ex. 1 | 6.1 | 0.52 |
| Ex. 2 | 7.4 | 0.48 |
| Comp. Ex. 1 | 8.6 | 0.00 |
| Comp. Ex. 2 | 2.4 | 1.43 |

Evaluation Example 3: Evaluation of Battery Performance

Each of the lithium secondary batteries was subjected to charge/discharge. Particularly, at the first cycle and the second cycle, charge/discharge was carried out at 0.1 C. Then, from the third cycle to the $49^{th}$ cycle, charge/discharge was carried out at 0.5 C. The $50^{th}$ cycle was terminated in a charged state (state in which lithium is intercalated to the negative electrode).

Charging condition: constant current (CC)/constant voltage (CV) (5 mV/0.005 C current cut-off)

Discharging condition: CC condition, 1.5V

As a result, initial capacity (mAh/g), initial efficiency (%) and capacity maintenance (%) were calculated according to the following mathematical formulae. The results are shown in the following Table 3.

Initial capacity (mAh/g)=discharge capacity at the first cycle

Initial efficiency (%)=(discharge capacity at the first cycle/charge capacity at the first cycle)×100

Capacity maintenance (%)=(discharge capacity at the 49$^{th}$ cycle/discharge capacity at the first cycle)×100

TABLE 3

|  | Initial capacity (mAh/g) | Initial efficiency (%) | Capacity maintenance after 50 cycles (%) |
| --- | --- | --- | --- |
| Ex. 1 | 407.6 | 90.3 | 72.8 |
| Ex. 2 | 405.3 | 90.6 | 76.1 |
| Comp. Ex. 1 | 399.8 | 90.4 | 69.9 |
| Comp. Ex. 2 | 402.4 | 89.2 | 70.9 |

As can be seen from Table 3, the batteries using the negative electrode active materials according to Examples 1 and 2 and Comparative Example 1 show similar results in terms of initial efficiency. However, Examples 1 and 2 provided with a LiF coating layer show higher battery performance in terms of initial capacity and life characteristics, as compared to Comparative Example 1 having no LiF coating layer. In the case of Comparative Example 1, LiF as a lithium source is converted into lithium silicate and shows high initial efficiency. However, it is thought that volumetric expansion of SiO$_x$ and depletion of an electrolyte become severe as compared to Examples 1 and 2 due to the absence of a LiF coating layer, and active silicon that contributes to charge/discharge during the formation of lithium silicate is damaged to cause a decrease in capacity.

In the case of Comparative Example 2, a small amount of LiF reacts on the SiO surface to form lithium silicate, thereby providing the lowest efficiency. In addition, a thick LiF coating layer is formed to cause high resistance, resulting in poor battery performance in terms of capacity and life characteristics.

What is claimed is:

1. A negative electrode active material, comprising:
   a core;
   an intermediate layer on a surface of said core; and
   a shell layer on a surface of said intermediate layer,
   wherein the core comprises a silicon oxide of formula SiO$_x$ wherein 0<X<2;
   the intermediate layer comprises a lithium silicate;
   the shell comprises lithium fluoride (LiF); and
   the intermediate layer is present in an amount of 5 wt %-15 wt % based on a total weight of the negative electrode active material.

2. The negative electrode active material according to claim 1, wherein the silicon oxide comprises a nanocomposite structure in which Si is present in combination with SiO$_2$.

3. The negative electrode active material according to claim 1, wherein the lithium silicate comprises lithium silicate represented by the formula of Li$_a$Si$_b$O$_c$, wherein 2<a≤4, 0<b≤2, 2<c≤5 and SiO$_y$, wherein 0<y<2.

4. The negative electrode active material according to claim 3, wherein the lithium silicate comprises Li$_2$Si$_2$O$_5$, Li$_2$SiO$_3$ and Li$_4$SiO$_4$.

5. The negative electrode active material according to claim 1, wherein the intermediate layer has a thickness of 1 nm-1,000 nm.

6. The negative electrode active material according to claim 1, wherein the shell layer is present in an amount of 0.1 wt %-3 wt % based on the total weight of the negative electrode active material.

7. The negative electrode active material according to claim 1, wherein the shell layer has a thickness of 10 nm-200 nm.

8. The negative electrode active material according to claim 1, which further comprises a carbon coating layer on a surface of the shell layer.

9. A negative electrode comprising a current collector and an electrode layer formed on at least one surface of the current collector, wherein the electrode layer comprises the negative electrode active material as defined in claim 1.

10. A lithium secondary battery comprising the negative electrode as defined in claim 9.

* * * * *